United States Patent [19]

Nagasaki et al.

[11] Patent Number: 5,246,493
[45] Date of Patent: Sep. 21, 1993

[54] GOLDEN YELLOW PIGMENT

[75] Inventors: Shunsuke Nagasaki, Toyama; Kajin Saito, Nara; Takuya Tamou, Kanagawa, all of Japan

[73] Assignees: Showa Denko K.K., Tokyo; Showa Alumi Powder K.K., Nara, both of Japan

[21] Appl. No.: 945,716

[22] Filed: Sep. 15, 1992

[30] Foreign Application Priority Data

Apr. 12, 1991 [JP] Japan .................................. 3-108782

[51] Int. Cl.$^5$ ............................................. C09C 1/36
[52] U.S. Cl. .................................... 106/436; 106/403
[58] Field of Search ............................... 106/403, 436

[56] References Cited

FOREIGN PATENT DOCUMENTS 56-129269 10/1981 Japan .
58-219265 12/1983 Japan .
59-13609 1/1984 Japan .
61-69958 4/1986 Japan .
4-45171 2/1992 Japan .

Primary Examiner—Mark L. Bell
Assistant Examiner—Chris Gallo
Attorney, Agent, or Firm—Sughrue, Mion, Zinn, Macpeak & Seas

[57] ABSTRACT

A golden yellow pigment having good corrosion resistance and weather resistance is disclosed, which comprises titanium metal flakes the surfaces of which are covered with a titanium nitride layer, the titanium nitride-covered titanium metal flakes having a nitrogen content of from 5 to 22% by weight, an oxygen content of 2% by weight or less, and an aspect ratio of 10 or more.

8 Claims, No Drawings

GOLDEN YELLOW PIGMENT

FIELD OF THE INVENTION

The present invention relates to a golden yellow pigment which can be mainly used, for example, as a pigment for coating compositions, plastic compounds, and ceramics and which has excellent corrosion resistance and weather resistance.

BACKGROUND OF THE INVENTION

As is generally known, the color which human beings have most frequently used for coloring from ancient times is golden yellow. Representative known substances of a golden yellow color include gold, brass, and titanium nitride. As pigments of a golden yellow color, minute flakes of brass as well as foils of gold are being frequently used. However, gold is expensive and brass has a drawback that it changes in color upon corrosion. Titanium nitride has a drawback that because it has a hard and brittle nature, a titanium nitride powder generated cannot be formed into flakes.

Other known materials of a golden yellow color include mica coated with titanium dioxide and iron oxide (JP-A-56-129269) (The term "JP-A" as used herein means an "unexamined published Japanese patent application".), a material obtained by subjecting titanium to nitriding treatment and then forming a titanium nitride film by ion plating (JP-A-61-69958), and a pigment obtained by forming a nitride, carbide, or oxide of a metal such as Ti, Hf, Zr, or Ta on the surface of a heat-resistant resin and then peeling the metal compound covering from the resin surface to form flakes of the metal compound (JP-A-58-219265). However, the pigment obtained through surface treatment of a resin as a substrate cannot have weather resistance or durability. Further, the technique of nitriding titanium is defective in that although this technique is applicable to titanium plates, it cannot be applied to titanium particles that are so small as to be used as a pigment.

In order that a fine powder to be used as a pigment have a high light reflection, each powder particle is required to have a smooth and flat surface and, in addition, the powder, when used as a pigment, should be distributed in such a manner that these smooth and flat surfaces are arranged in parallel. Although titanium nitride is of a golden yellow color, a titanium nitride flake powder composed of titanium nitride and having a smooth and flat surface cannot be produced at low cost through malleating (milling) treatment because titanium nitride is a ceramic having high hardness.

SUMMARY OF THE INVENTION

An object of the present invention is to provide a golden yellow pigment which is inexpensive and excellent in water resistance, chemical resistance, wear resistance, fastness, and other properties.

Another object of the present invention is to provide an inexpensive golden yellow pigment which is excellent not only in the overall durability, including weather resistance sufficient for outdoor uses, such as automotive uses, and corrosion resistance sufficient to withstand acid rain, but also in hiding power and which therefore eliminates the above-described drawbacks of the conventional golden yellow pigments.

The present inventors have found that fine flakes of a golden yellow color can be produced when a powder of titanium metal flakes having a smooth and flat surface is treated to form a titanium nitride layer on the surface of each flake, and that the thus-obtained fine flakes of a golden yellow color can be advantageously used as a golden yellow pigment. The present invention has been completed based on this finding.

The golden yellow pigment according to the present invention is characterized in that it comprises titanium metal fine flakes the surfaces of which are covered with a titanium nitride layer, and that the titanium nitride-covered titanium metal flakes have a nitrogen content of from 5 to 22% by weight, an oxygen content of 2% by weight or less, and an aspect ratio (the ratio of the diameter to the thickness of the flakes) of 10 or more.

DETAILED DESCRIPTION OF THE INVENTION

The pigment provided by the present invention comprises flakes each comprising a core of titanium metal and a layer of titanium nitride covering the surface of the core, and is hence of a golden yellow color. This specific structure has been obtained by heating flakes of titanium metal at a high temperature in a nitrogen atmosphere thereby to convert only the surface layer of each titanium metal flake into titanium nitride. Since the golden yellow pigment of the present invention is such a flake in which the surface layer consists of titanium nitride and is of a golden yellow color and the central part consists of titanium metal only, with the titanium nitride being tenaciously bonded to and united with the titanium metal, it is a pigment having high toughness, excellent weather and corrosion resistance, and high hiding power.

The flakes constituting the golden yellow pigment of the present invention have a nitrogen content of from 5 to 22% by weight, preferably from 15 to 20% by weight, and an oxygen content of 2% by weight or less, preferably 1.5% by weight or less. The lower the nitrogen content and the higher the oxygen content of the flakes, the darker the golden yellow color of the pigment. If the flakes have a nitrogen content below 5% by weight and an oxygen content above 2% by weight, the color of the pigment is so low in chroma that it is practically unusable as a golden yellow pigment. On the other hand, the higher the nitrogen content of the flakes, the more the color of the pigment is close to the reddish golden yellow color of pure gold. The flakes of the pigment may, therefore, have a nitrogen content of from 20 to 22% by weight and an oxygen content of 1.2% by weight or less. It should, however, be noted that if titanium metal flakes are nitrided entirely to the innermost parts thereof, the thus-obtained titanium nitride flakes have no smooth and flat surface, so that the color of the pigment is too low in lightness and the pigment cannot be regarded as a golden yellow pigment any more. Therefore, the upper limit of the degree of nitriding should be such that a slight part of the titanium metal remains unnitrided, and such a nitriding degree corresponds to a nitrogen content of 22% by weight while pure titanium nitride has a nitrogen content of 23% by weight.

The flakes of the pigment have an aspect ratio of 10 or more. If the aspect ratio of the flakes is below 10, the area of light-reflecting flat surfaces is too small. Such flakes are defective in that when compounded with plastics, it cannot produce a so-called golden yellow color, and that when the flakes are incorporated as a pigment into coating compositions, the colors of coating films obtained from the compositions are low in lightness because of poor parallel arrangement of the flakes and, hence, a golden yellow color cannot be obtained.

The golden yellow pigment of the present invention has the surface covered with a golden yellow titanium nitride that does not change in color or quality due to its high corrosion resistance and is less apt to suffer marring or deformation due to its high hardness. It is preferable that the pigment of the present invention has an average particle diameter of from 5 to 500 μm and a water-covering area (the water surface area which, when 1 g of powder is floated on water, is covered by the powder particles; hereinafter referred to as WCA) of from 600 to 10,000 cm²/g.

The flakes of the golden yellow pigment of the present invention do not always have a disk shape. However, when the shape of each flake is regarded as a disk shape, the average particle diameter of the flakes is preferably about from 5 to 500 μm. As the particle diameter of flakes becomes smaller, the flakes tend to have a lower light reflectance. If flakes have an average particle diameter below 5 μm, the color of such flakes is so low in lightness that the flakes may not be suitable for use as a golden yellow pigment. On the other hand, flakes having an average particle diameter exceeding 500 μm are not preferred because it becomes difficult to ensure surface smoothness to colored films or articles obtained using such flakes as a colorant for coating compositions, paints, or the like or for plastic compounds. The term "average particle diameter" used herein means a diameter corresponding to the cumulative volume percentage of 50% in the particle size distribution measured by a laser diffraction type particle size analyser (SALD-1100, manufactured by SHIMADZU CORP.).

The WCA of the pigment is preferably from 600 to 10,000 cm²/g (corresponding to a thickness of about from 0.2 to 3 μm) as mentioned above and more preferably from 1,600 to 9,800 cm²/g.

A pigment having a WCA larger than 10,000 cm²/g is not preferred in that it tends to contain a considerable amount of warped flakes and, hence, it is poor in the property of being arranged in parallel and has a low light reflectance. Therefore, such a pigment may not produce a so-called golden yellow color. A pigment having a WCA below 600 cm²/g is not preferred in that coating compositions employing this powder as a pigment tend to have low hiding power and they are, hence, required to be coated at larger thicknesses and this is economically disadvantageous, and that such coating films and colored articles obtained using this pigment may have poor surface smoothness.

According to the $L^*a^*b^*$ color system proposed by the CIE (Commission Internationale de l'Eclairage) in 1976 as described JIS Z8730-1980, ideal golden yellow color of gold foil to be desired has an $L^*$ value of 76.0, an $a^*$ value of 3.6, and a $b^*$ value of 26.4, which means that the golden yellow color basically is a yellow-based color having high lightness and slight redness. In the $L^*a^*b^*$ color system, $L^* > 0$ indicates white hue, $L^* < 0$ indicates black hue, $a^* > 0$ indicates red hue, $a^* < 0$ indicates green hue, $b^* > 0$ indicates yellow hue, and $b^* < 0$ indicates blue hue. Thus, a desired golden yellow pigment is a pigment the color of which has an $L^*$ value as large as possible, an $a^*$ value close to 3.6, and a $b^*$ value close to 26.4.

When the color of the golden yellow pigment of the present invention is described using the $L^*a^*b^*$ color system explained above, the $L^*$, $a^*$, and $b^*$ value of the color preferably are $50 \leq L^* \leq 65$, $0 < a^* \leq 4$, and $15 \leq b^* \leq 30$. Particularly preferred combinations of the $L^*$, $a^*$, and $b^*$ value are: $60 \leq L^* \leq 65$, $3.4 \leq a^* \leq 3.7$, and $26 \leq b^* \leq 28$; and $50 \leq L^* \leq 59$, $1.7 \leq a^* \leq 3.3$, and $19 \leq b^* \leq 25$.

A method for producing the golden yellow pigment according to the present invention is explained below.

The golden yellow pigment of the present invention can be produced by heating titanium metal flakes having an oxygen content of 1% by weight or less and an aspect ratio of 12 or more in a nitrogen atmosphere having a temperature of 600° to 1,000° C., preferably for at least one hour.

The raw titanium metal flakes to be used for producing the golden yellow pigment of the present invention have an oxygen content of 1% by weight or less and an aspect ratio of 12 or more. If titanium metal flakes having an oxygen content more than 1% by weight are used as a raw material, the thus-obtained titanium metal fine flakes covered with titanium nitride have an oxygen content exceeding 2% by weight because of absorption of a small amount of oxygen during the nitriding, so that a golden yellow pigment according to the present invention cannot be obtained. It should be noted that although titanium nitride-covered titanium metal flakes obtained by this method have almost the same diameters as the raw titanium metal flakes used, the thickness of each flake increases upon nitriding in proportion to the degree of titanium nitride formation. Therefore, if titanium metal flakes having an aspect ratio outside the above-specified range are used as a raw material, the thus-obtained golden yellow pigment does not satisfy the aspect ratio requirement described hereinabove and has poor properties.

The raw titanium metal flakes can be produced by a conventional wet-type grinding method wherein a titanium metal powder is subjected to malleating treatment in a wet-type ball mill using a mineral spirit as a medium, as described in Japanese Patent Application No. Hei-2-250128.

It is preferred that the raw titanium metal flakes have an average particle diameter of from 5 to 500 μm and a WCA of from 900 to 22,200 cm²/g (corresponding to a thickness of about from 0.1 to 2.5 μm).

Nitrogen gas to be used for producing the golden yellow pigment of the present invention may have a purity of 98% or more. In such nitrogen gas, raw titanium metal flakes may be heated at a temperature of from 600° to 1,000° C. Heating temperatures below 600° C. are not preferred in that the nitriding reaction does not take place, or if the reaction proceeds, the rate thereof is exceedingly low and this is uneconomical. Heating temperatures exceeding 1,000° C. are not preferred in that sintering can occur between flakes, resulting in deformed or agglutinated flakes. Since the rate of nitriding increases exponentially with increasing temperature, the time for nitriding should be long at low temperatures and may be short at high temperatures. However, besides having the problem described above, heating temperatures exceeding 1,000° C. are not preferred in that nitriding proceeds very rapidly at such high temperatures and, as a result, the nitrided flakes have poor surface smoothness and a reduced light reflectance.

As described above, the golden yellow pigment of the present invention has been obtained by using flaky titanium having good toughness as a base and nitriding only the surface layer of the titanium base thereby to enable the base to have a golden yellow color. Therefore, the base and the nitride covering have been united with each other and, hence, the flakes of the pigment have excellent durability. Further, since the pigment of the present invention is based on flaky titanium, coating compositions employing this pigment give coating films of a golden yellow color which have high hiding power and excellent durability.

The present invention will be explained below in more detail with reference to the following examples, but the invention is not construed as being limited thereto.

EXAMPLE 1

100 g of titanium metal flakes having an oxygen content of 0.33% by weight, an average particle diameter of 69 μm, WCA of 950 cm²/g (thickness calculated therefrom of 2.34 μm), and an aspect ratio of 29.5 were spread evenly on a porcelain dish having dimensions of 10 cm by 20 cm at a thickness of about 5 mm. In an electric furnace, the titanium metal flakes on the dish were heated to 700° C. and held at this temperature for 1 hour, while nitrogen gas having an $N_2$ content of 98.5% by weight was kept being passed through the furnace at a flow rate of 1,000 ml/min. After cooling, the dish was taken out of the furnace, thereby obtaining a fine flake powder of a golden yellow color. This powder weighed 107 g, showing that the weight thereof had increased by 7 g through the treatment. The golden yellow powder had an oxygen content of 0.7% by weight, a nitrogen content of 6.5% by weight, an average particle diameter of 69.8 μm, WCA of 700 cm²/g, and an aspect ratio of 23.3.

The color of the thus-obtained powder, as described according to the L*a*b* color system, is shown in Table 1 under "Properties of Golden Yellow Powder Produced".

Color measurement was conducted as follows. An art paper having dimensions of 8 cm by 8 cm was uniformly coated with 3M Bond for Textile Printing (Spray Type) (manufactured by Sumitomo 3M Ltd., Japan). On the coating was uniformly scattered the golden yellow powder at such a thickness that the paper surface became invisible. The scattered powder was pressed against the paper by rolling a steel roller having a diameter of 10 cm and a length of 15 cm (weighing about 6 kg) forward and backward once on the powder, and the powder remaining unfixed were then swept away with a soft-bristle brush, thereby giving a sample plate. The color of this sample plate was measured with a colorimeter (Σ-90 color mesuring system, manufactured by Nippon Denshoku Kogyo Co., Ltd., Japan).

The golden yellow powder was further subjected to X-ray quantitative analysis and, as a result, the presence of both titanium and titanium nitride was ascertained. Further, several flakes were arbitrarily selected and sections thereof were analyzed by an electron probe microanalyser. As a result, it was ascertained that in each flake, the closer to the surface, the higher the nitrogen concentration, and the closer to the central part, the lower the nitrogen concentration. From these results, it was presumed that titanium nitride had been formed on the surface of each titanium metal flake.

Two grams of the above-obtained golden yellow fine flaky powder was mixed as a pigment with 98 g of a low-density polyethylene powder (Sholex M113, manufactured by Showa Denko K.K., Japan), and this mixture was liquified by heating and then formed into a film having a thickness of 0.5 mm. Thus, a polyethylene film of a beautiful golden yellow color was obtained.

EXAMPLES 2 TO 6

Golden yellow powders were obtained in the same manner as in Example 1 except that the raw titanium flakes and nitriding conditions were changed as shown in Table 1. Properties of the thus-obtained golden yellow powders are shown in Table 1.

A coating composition was prepared by mixing as a pigment 30 g of the golden yellow powder obtained in Example 4 and 70 g of a 10% aqueous solution of sodium silicate. This coating composition was applied on a concrete panel with a brush, thereby obtaining a concrete panel of a golden yellow color.

TABLE 1

| | Example No. | | | | | |
|---|---|---|---|---|---|---|
| | 1 | 2 | 3 | 4 | 5 | 6 |
| Production Condition | | | | | | |
| Raw Ti flakes: | | | | | | |
| Oxygen content (wt %) | 0.33 | 0.43 | 0.60 | 0.74 | 0.87 | 0.98 |
| Average particle diameter (μm) | 69.0 | 487 | 22.3 | 28.1 | 5.5 | 11.7 |
| WCA (cm²/g) | 950 | 1200 | 9800 | 4700 | 21800 | 2300 |
| Aspect ratio | 29.5 | 263.0 | 98.3 | 59.4 | 54.0 | 12.1 |
| Nitrogen gas purity ($N_2$ content, wt %) | 98.5 | 98.0 | 98.5 | 99.0 | 99.5 | 98.0 |
| Nitriding Condition: | | | | | | |
| Temperature (°C.) | 700 | 990 | 850 | 900 | 800 | 900 |
| Time (hr) | 1 | 1 | 1 | 2 | 2 | 1 |
| Properties of Golden Yellow Powder Produced: | | | | | | |
| Weight increase (g) | 7.0 | 21.1 | 17.0 | 21.7 | 21.0 | 15.0 |
| Nitrogen content (wt %) | 6.5 | 20.3 | 16.4 | 21.2 | 20.7 | 14.2 |
| Oxygen content (wt %) | 0.7 | 1.2 | 1.2 | 1.2 | 1.2 | 1.8 |
| Average particle diameter (μm) | 69.8 | 493 | 23.8 | 28.7 | 6.0 | 12.7 |
| WCA (cm²/g) | 700 | 670 | 6500 | 2600 | 9800 | 1600 |
| Aspect ratio | 23.3 | 176.3 | 79.7 | 39.6 | 31.2 | 10.4 |
| Color: | | | | | | |
| L* | 62.21 | 60.32 | 54.83 | 61.12 | 53.25 | 52.62 |
| a* | 0.08 | 3.62 | 1.73 | 3.58 | 3.32 | 1.78 |
| b* | 17.19 | 27.03 | 20.54 | 26.85 | 23.98 | 19.04 |

EXAMPLE 7

100 g of titanium metal flakes having an oxygen content of 0.54% by weight, an average particle diameter of 18.3 μm, WCA of 18,200 cm²/g (thickness calculated therefrom of 0.12 μm), and an aspect ratio of 149.9 were spread evenly on a porcelain dish having dimensions of 10 cm by 20 cm at a thickness of about 5 mm. In an electric furnace, the titanium metal flakes on the dish were heated to 900° C. and held at this temperature for 2 hours, while nitrogen gas having an $N_2$ content of 98.5% by weight was kept being passed through the furnace at a flow rate of 1,000 ml/min. After cooling, the dish was taken out of the furnace, thereby obtaining a fine flake powder of a golden yellow color. This powder weighed 121 g, showing that the weight thereof had increased by 21 g through the treatment. The golden yellow powder had an oxygen content of 0.9% by weight, a nitrogen content of 20.5% by weight, an average particle diameter of 17 μm, WCA of 9,300 cm²/g, and an aspect ratio of 81.

The color of the thus-obtained powder was measured in the same manner as in Example 1. As a result, the color had L* value of 57.03, a* value of 3.44, and b* value of 24.71 according to the CIE L*a*b* color system.

A coating composition was prepared by mixing as a pigment 16 g of the golden yellow powder obtained above and 84 g of an acrylic lacquer (ACRIC 2000GL, manufactured by Kansai Paint Co., Ltd., Japan). This coating composition was coated on a 0.4 mm-thick white plastic plate by means of a 6-mil doctor blade, thereby obtaining a coating film of a beautiful golden yellow color. The color of this coating film was measured with a colorimeter (Σ-90 color measuring system) and the L*, a*, and b* value thereof according to the CIE L*a*b* color system are shown in Table 2 under "Original coating film". Compared to the color of the powder as described above, the color of the coating film was darker by a degree corresponding to covering of the pigment by the acrylic resin (had smaller L*, a*, and b* values).

This coating film was examined for corrosion resistance as follows. Each of corrosive liquids specified below was poured on the plastic plate on the golden yellow coating film side so as to form thereon a thick, circular layer of the corrosive liquid having a diameter of about 4 cm. After this plastic plate was allowed to stand for 48 hours, the color of the coating film's part that had underlay the corrosive liquid layer was measured and described according to the L*a*b* color system and a color change by corrosion was evaluated. The corrosive liquids used were 10% aqueous solutions of HCl, HNO₃, H₂SO₄, H₃PO₄, NaOH, NH₄OH, and NaCl, respectively. The results obtained are shown in Table 2, in which the color changes (difference) caused by corrosion are shown in terms of difference in L*, a*, or b* value between the original coating film and the coating film after 48-hr corrosion.

For the purpose of comparison, a coating composition was prepared by mixing as a pigment 25 g of 70% Cu-30% Zn brass powder (Rich Gold Type 2L7, manufactured by FUKUDA METAL FOIL & POWDER Co., Ltd.), which is a gold foil substitute currently used extensively, and 75 g of an acrylic lacquer. This coating composition was coated on a 0.4 mm-thick white plastic plate by means of a 6-mil doctor blade, and the thus-obtained coating film was subjected to the same corrosion test. The results obtained are also shown in Table 2.

TABLE 2

| | Corrosive Chemicals (10% aq. solution) | | | | | | |
|---|---|---|---|---|---|---|---|
| | HCl | HNO₃ | H₂SO₄ | H₃PO₂ | NaOH | NH₄OH | NaCl |
| Golden Yellow Pigment of the Present Invention: | | | | | | | |
| L* Original coating film | 57.29 | 57.34 | 57.01 | 56.54 | 56.99 | 57.09 | 57.14 |
| Coating film after 48-hr corrosion | 56.50 | 58.11 | 57.04 | 56.64 | 56.32 | 57.25 | 57.22 |
| Difference (color change) | −0.79 | 0.77 | 0.03 | 0.10 | −0.67 | 0.16 | 0.08 |
| a* Original coating film | 2.48 | 2.51 | 2.56 | 2.52 | 2.53 | 2.50 | 2.47 |
| Coating film after 48-hr corrosion | 2.52 | 2.53 | 2.53 | 2.49 | 2.36 | 2.54 | 2.51 |
| Difference (color change) | 0.04 | 0.02 | −0.03 | −0.03 | −0.17 | 0.04 | 0.04 |
| b* Original coating film | 22.11 | 22.07 | 22.66 | 22.66 | 22.36 | 22.41 | 22.33 |
| Coating film after 48-hr corrosion | 22.76 | 22.42 | 22.58 | 22.33 | 21.96 | 22.49 | 22.39 |
| Difference (color change) | 0.65 | 0.35 | −0.08 | −0.33 | −0.40 | 0.08 | 0.06 |
| 70% Cu-30% Zn Brass Pigment: | | | | | | | |
| L* Original coating film | 76.01 | 75.72 | 76.03 | 76.03 | 76.01 | 76.20 | 75.98 |
| Coating film after 48-hr corrosion | 57.85 | 47.45 | 63.02 | 70.86 | 92.11 | 43.80 | 67.86 |
| Difference (color change) | −18.16 | −28.27 | −13.01 | −5.17 | 16.10 | −32.40 | −8.12 |
| a* Original coating film | −3.70 | −3.66 | −3.68 | −3.68 | −3.70 | −3.70 | −3.61 |
| Coating film after 48-hr corrosion | 6.26 | 0.32 | −1.89 | −2.70 | −0.56 | −2.55 | −3.14 |
| Difference (color change) | 9.96 | 3.98 | 1.79 | 0.98 | 2.99 | 1.15 | 0.47 |
| b* Original coating film | 28.53 | 28.59 | 28.51 | 28.65 | 28.61 | 28.61 | 28.64 |
| Coating film after 48-hr corrosion | 16.04 | 12.24 | 19.40 | 22.26 | 0.14 | 4.10 | 24.63 |
| Difference (color change) | −12.49 | −16.35 | −9.11 | −6.39 | −28.47 | −24.51 | −4.01 |

According to the present invention, a golden yellow pigment having excellent durability can be obtained by a simple process. Color tone regulation for the golden yellow pigment is possible over a wide range.

The pigment of the present invention has good toughness, high hiding power, and excellent weather and corrosion resistance and is, therefore, usable in a wide range of applications including coating compositions, plastic compounds, and ceramic coloring.

While the invention has been described in detail and with reference to specific embodiments thereof, it will be apparent to one skilled in the art that various changes and modifications can be made therein without departing from the spirit and scope thereof.

What is claimed is:

1. A golden yellow pigment comprising titanium metal flakes, the surfaces of which are covered with a titanium nitride layer, the titanium nitride-covered titanium metal flakes having a nitrogen content of from 5 to 22% by weight, an oxygen content of 2% by weight or less, and an aspect ratio of 10 or more.

2. A golden yellow pigment as claimed in claim 1, wherein said titanium nitride-covered titanium metal flakes have a nitrogen content of from 15 to 20% by weight, an oxygen content of 1.5% by weight or less, and an aspect ratio of 25 or more.

3. A golden yellow pigment as claimed in claim 1, wherein said titanium nitride-covered titanium metal flakes have a nitrogen content of from 20 to 22% by weight, an oxygen content of 1.2% by weight or less, and an aspect ratio of 50 or more.

4. A golden yellow pigment as claimed in claim 1, which has an average particle diameter of from 5 to 500 μm, a water-covering area of from 600 to 10,000 cm²/g, and a color having an L*, a*, and b* value of $50 \leq L^* \leq 65$, $0 < a^* \leq 4$, and $15 \leq b^* \leq 30$ according to the $L^*a^*b^*$ color system.

5. A golden yellow pigment as claimed in claim 1, which has a color having an $L^*$, $a^*$, and $b^*$ value of $60 \leq L^* \leq 65$, $3.4 \leq a^* \leq 3.7$, and $26 \leq b^* \leq 28$ according to the $L^*a^*b^*$ color system.

6. A golden yellow pigment as claimed in claim 1, which has a color having an $L^*$, $a^*$, and $b^*$ value of $50 \leq L^* \leq 59$, $1.7 \leq a^* \leq 3.3$, and $19 \leq b^* \leq 25$ according to the $L^*a^*b^*$ color system.

7. A golden yellow pigment as claimed in claim 1, which has an average particle diameter of from 5 to 500 μm and a water-covering area of from 1,600 to 9,800 cm²/g.

8. A golden yellow pigment as claimed in claim 1, which is produced by subjecting a titanium metal powder to malleating treatment in a wet ball mill using a mineral spirit as a medium to obtain titanium metal flakes having an oxygen content of 1% by weight or less and an aspect ratio of 12 or more and then heating said titanium metal flakes in a nitrogen atmosphere having a nitrogen content of 98% or more at a temperature of 600° to 1,000° C. for at least one hour.

* * * * *